Figure 1:
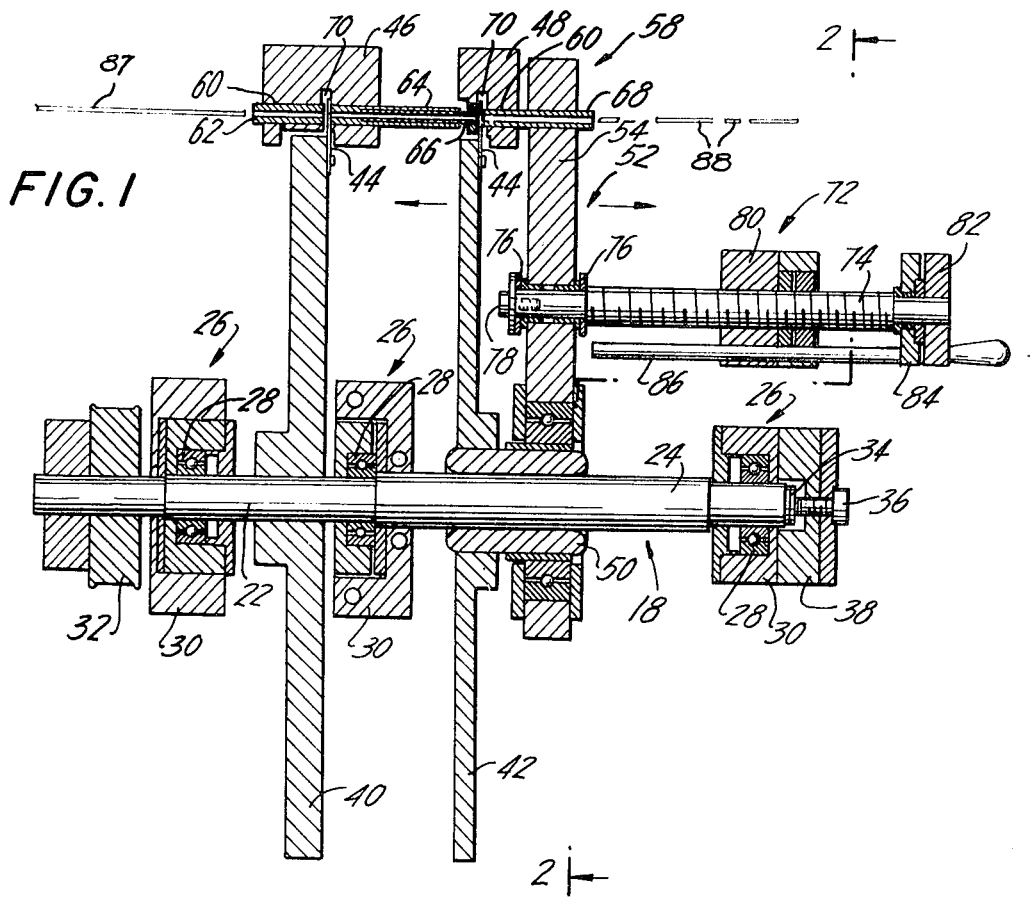

United States Patent
Vyncke

[15] 3,636,806
[45] Jan. 25, 1972

[54] MULTIPLE ACTING CUTTER WITH ADJUSTABLE FEATURES

[72] Inventor: Johan Vyncke, Mariakerke Gent, Belgium
[73] Assignee: Dart Industries, Inc., Los Angeles, Calif.
[22] Filed: Mar. 2, 1970
[21] Appl. No.: 15,750

[52] U.S. Cl..................................83/355, 83/357, 83/440, 83/517, 83/592
[51] Int. Cl..................................B26d 5/08
[58] Field of Search..................83/357, 355, 517, 516, 592, 83/594, 595, 440

[56] References Cited

UNITED STATES PATENTS

| | | | |
|---|---|---|---|
| 1,216,315 | 2/1917 | Heckman | 83/517 X |
| 1,776,861 | 9/1930 | Leichner | 83/517 |
| 3,455,197 | 7/1969 | Richardson | 83/517 X |
| 1,745,504 | 2/1930 | Rabinowitz | 83/516 |
| 2,217,766 | 10/1940 | Neff | 83/355 X |

Primary Examiner—James M. Meister
Attorney—Leigh B. Taylor, Paul R. Wylie and Harold R. Beck

[57] ABSTRACT

A cutoff device adapted to sever running lengths of stock material to length which includes a plurality of rotating cutting members that are adjustable with respect to one another. A telescoping material guideway is also provided as a part of the cutting member anvils and the anvil associated with the movable cutting member is similarly and simultaneously movable with that member.

5 Claims, 2 Drawing Figures

FIG.1

INVENTOR
JOHAN VYNCKE
BY
*[signature]*
ATTORNEY

MULTIPLE ACTING CUTTER WITH ADJUSTABLE FEATURES

This invention relates to a cutoff device for cutting running lengths plastic stock material and more particularly for cutting tubular material to length.

Cutting machinery is employed in many industrial applications. In numerous of these applications, it is the principal object to cut numerous articles to substantially uniform lengths from an indefinite running length stock material. Similarly, it is not unusual to want to be able to vary the severed article length based upon the particular subsequent end use thereof.

To accomplish these results, one may employ a variety of relatively sophisticated devices; for example, cutoff machines which use timing devices or material sensors for cutter actuation. Similarly, "flying" cutters may also be employed to obtain accurately sized articles. These devices, however, are of a somewhat complicated construction and in many respects are unsuitable for handling certain types of material.

In the event a timing cycle is used to trigger the cutter, a positive and accurate feed must be assured if uniform article lengths are to be maintained. This is not always possible with small lubricous stock materials. Likewise, sensing mechanisms dictate the same requirements because of the necessitated delay between sensing and actual cutoff, during which delay material feed continues.

As indicated, "flying" cutters are also useful to produce repetitive articles of substantially uniform lengths. These, however, rely upon either the running stock material or require an additional driving mechanism to propel the cutting element along the path of travel of the stock material during the cutting cycle.

It should also be apparent that various plural feeding systems might be used to appropriately advance the stock to a relatively conventional single cutter device. But these also complicate the overall construction of such a device, especially if versatility is to be retained such as to enable severance of stock material to selective and varied article lengths.

Prior art sheet cutting apparatus have also been devised which incorporate plural cutting elements spaced along the path of travel of the stock material. These arrangements normally employ reciprocating cutters and some are constructed to enable the adjustment of one cutter with respect to the other. Such apparatus are, however, cumbersome and slow, and are therefore relatively inefficient in operation. It should also be noted that where plural simultaneous cutting is employed to sever articles to length, a scrap end is usually produced and in many applications, such scrap is a highly undesirable byproduct.

Briefly, this invention includes among others constructional features which enable the user to accurately adjust one cutter assembly with respect to another without interruption of machine operation. There is also provided a stock material guideway arrangement that is adapted to support the stock material at substantially all locations adjacent to and between these cutter assemblies.

It therefore is one object of this invention to provide a simple apparatus for concomitantly making two or more cuts in a running length of stock material, at a distance from each other which remains substantially uniform during successive cutting operations.

Another object is to cut a waste or scrap portion and a useful portion simultaneously from a strip of stock material.

Still another object is the provision of a cutting apparatus for making spaced cuts at distances from each other which remain substantially uniform so long as desired, but which may be easily varied or adjusted when and as desired.

Figure 2:
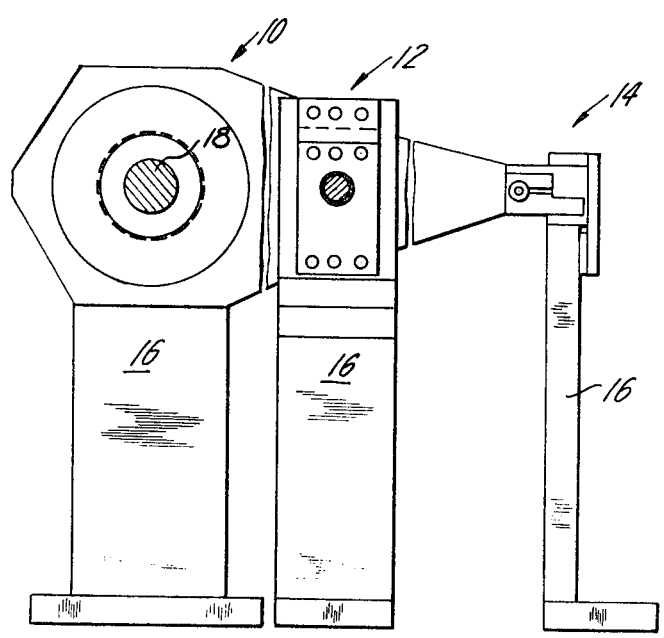

These and other objects and advantages of the invention reside in certain improvements and combinations of parts, all of which are more fully described hereinafter, the novel features being particularly pointed out in the appended claims and where in the drawings:

FIG. 1 is a plan view in cross section of apparatus constructed in accordance with a preferred embodiment of the invention; and, FIG. 2 is a side view of such apparatus and its associated framework broken apart to better show the component parts thereof.

Referring first to FIG. 2, it can be seen that the cutoff apparatus of this invention incorporates a framework supporting three basic components: a cutter assembly 10, an adjustment assembly 12, and a guideway and anvil arrangement 14. These components have been broken apart, as indicated, to better illustrate their respective orientations in the overall assembly. Each of these noted components is supported on a main frame 16 which may take any suitable form dependent upon the particular intended use of the apparatus.

Upon or within framework 16 may be found a driving means, preferably an electric motor (not shown) and its associated controls and driving train suitable for rotation of the main shaft assembly 18 more fully described hereinbelow. Also, in the preferred embodiment, a canopy 20 is removably attached to the framework 16 so that lubricants may be freely applied to the main shaft assembly as desired without contaminating the immediate area or the remainder of the apparatus. Similarly, such a canopy serves as a protective shield for operating personnel.

As should be evident, it may in some cases be desirable to construct the apparatus for portable movement and such is fully contemplated although not being so indicated in the preferred embodiment. It is also contemplated that suitable stock material feeding and article collection mechanisms (not shown) will be used in conjunction with this device. These also may be integral with the framework 16 or be retained as separate entities, as desired.

With reference to FIG. 1, it may be seen that the main shaft 22, a portion of which is splined as at 24 provides for the longitudinal movement of associated members therealong. This shaft 22 is preferably supported along its length by several bearing assemblies 26 which include suitable ball or roller bearings 28 positioned in bearing mounts 30. Of course, the bearing mounts are rigidly yet removably attached by any satisfactory holding means to the frame 16. At one end of the shaft, it has also been found preferable to mount a thrust bushing 34 and its adjustment screw 36. These are similarly attached to frame 16 through the block member 38.

Also positioned along the shaft 22 is a drive pulley arrangement 32, in this instance shown at one end of the shaft. These pulleys transmit the rotary motion of the motor (not shown) to the shaft and ultimately to the cutter members discussed below.

Two cutter members 40 and 42 are fastened to shaft 22 for rotation therewith; cutter member 40 being fixedly attached thereto. Each cutter member 40 and 42 have attached thereto at least one cutting element 44 each by any suitable means. These cutting elements mounted on members 40 and 42 are adapted to cooperate with anvils 46 and 48, respectively, during a portion of each cutting cycle as the shaft 22 and cutter members rotate together.

Cutter member 42 is fixedly attached to a splineway 50 which in turn is free to slide longitudinally along the splined portion 24 of shaft 22. This therefore enables the user to very simply vary the distance between cutter members and elements and consequently vary the length of the severed article. It is, however, necessary to control such adjustment of cutter member 42 and to similarly control the adjustment of its cooperating anvil 48 to assure satisfactory operation.

Movable yoke assembly 52 is provided for this purpose. At one end of yoke 54 bearing 56 fixedly attaches same to splineway 50. Similarly, at the other end, yoke 54 is attached to a portion of the guideway arrangement, more fully discussed below in such manner that anvil 48 is movable therewith. Therefore, any movement of the yoke 54 is reflected by a corresponding movement of both the cutter member 42 and its cooperating anvil 48.

As indicated, the guideway arrangement 58 on frame 16 is intended to accommodate and support the running length of stock material (not shown), in this instance small diameter plastic tubing, as it is presented to the cutting apparatus. A feeding mechanism (not shown) propels the material to and through the guideway and the uncut portion thereof serves as a discharge assistant for the severed useful and waste portions. The noted anvils 46 and 48 form a part of the guideway arrangement and passageways 60 therethrough are formed to accommodate guideway channels 62, 64, 66 and 68 through which the stock material passes. Channels 62 and 64 are securely attached to anvil 46; and channels 66 and 68 are similarly attached to anvil 48.

As is clearly evident upon continued reference to FIG. 1, channel 64 is of a somewhat larger outside diameter than channel 66 and has an inside diameter such that channel 66 may be accommodated thereby. Thus, channel 66 is free to slide within channel 64 and these projections therefore overlap and telescope upon one another as cutter member 42 and anvil 48 are adjusted with respect to cutter member 40 and its fixed anvil 46.

Each anvil construction is completed by a recessed opening 70 which interrupts the continuity of the channels and thereby extend across the path of travel of the stock material. These recesses are adapted to accept the cutting elements 44 and to cooperate therewith so that the material is cleanly and effectively severed as the cutting members revolve. In the preferred embodiment, the stock material enters channel 62 and severed articles exit through channel 68; however, the direction of material flow may be reversed if so desired.

Adjustment of the movable yoke assembly 52 may be provided by any satisfactory means among which is the threaded assembly 72. Here a lead screw 74 is attached to the yoke 54 through the bushings 76 with a cap and screw 78. The lead screw 74 is also threaded through nut 80, which nut is fixedly attached to the frame, thus providing a fixed point from which thrust may be accurately and effectively provided to the yoke 54. For ease of operation, a crank 82 is attached to the screw 74 and a dial indicator mount 84 is suitably fixed by sliding rod 86 to the nut 80 so as not to rotate with the screw. Thus, the indicator may be calibrated to reflect the distance between cutting elements 44 and thus the length of any severed article.

In operation, therefore, it will be apparent that simply by turning crank 82, the cutter member 44 and anvil 48 may be moved either away from or toward the fixed cutter member 40 and anvil 46. It should also be obvious that this adjustment may be made without interruption to machine operation and that such adjustment will remain fixed as long as is desired by the operator. This, then, will result in the production of unlimited quantities of severed articles that are all of substantially a uniform length.

I claim:

1. A cutoff device adapted to accurately sever to length running lengths of stock material and comprising:
   a. a rotational drive means carrying two cutter members, at least one of which is adjustably movable with respect to the other;
   b. a material guideway at least one portion of which is movable with respect to other portions thereof and including means to accept said cutter members during at least a portion of the cutting cycle;
   c. a yoke member attached to said one adjustably movable cutter member and further engaged with said movable portion of the material guideway; and,
   d. an adjustment means attached through said yoke to both said movable cutter and movable guideway in such manner that any movement of said adjustment means is reflected by the corresponding simultaneous movement of said movable cutter and said one portion of guideway.

2. A cutoff device according to claim 1 wherein said material guideway includes overlapping juxtaposed projections to accept said stock material and in which at least one projection is attached to and movable with said movable portion thereof.

3. A cutoff device according to claim 1 wherein said means to accept said cutter members are recessed openings through which the cutter members move as they cross the path of travel of said stock material.

4. A cutoff device adapted to accurately sever stock material to length and comprising:
   a. rotational drive means carrying a plurality of rotary cutter members, at least one of which is adjustably movable with respect to the others;
   b. a material guideway including anvil means, at least one of which is adjustably movable, that are adapted to accept and cooperate with said cutter members during a cutting cycle;
   c. a yoke member attached to said one adjustably movable cutter member and further engaged with said movable anvil means; and,
   d. adjustment means attached to said yoke in such manner that any movement of said adjustment means is reflected by a corresponding simultaneous movement of said movable cutter member and anvil means.

5. A cutoff device for accurately severing stock material and including
   a. a plurality of cutter members at least one of which is adjustably movable with respect to the others;
   b. drive means interengaged with said cutters and adapted to accommodate the movement of the said at least one movable cutter;
   c. a material guideway at least one portion of which is movable with respect to the other portions thereof and including corresponding means that cooperate with said cutters during the severance of said material;
   d. at least one yoke assembly linking said at least one adjustable cutter with said at least one corresponding movable guideway portion; and,
   e. at least one adjustment means attached through said at least one assembly to said corresponding movable cutter and guideway portion so that the movement of said adjustment means will be reflected thereby.

* * * * *